UNITED STATES PATENT OFFICE.

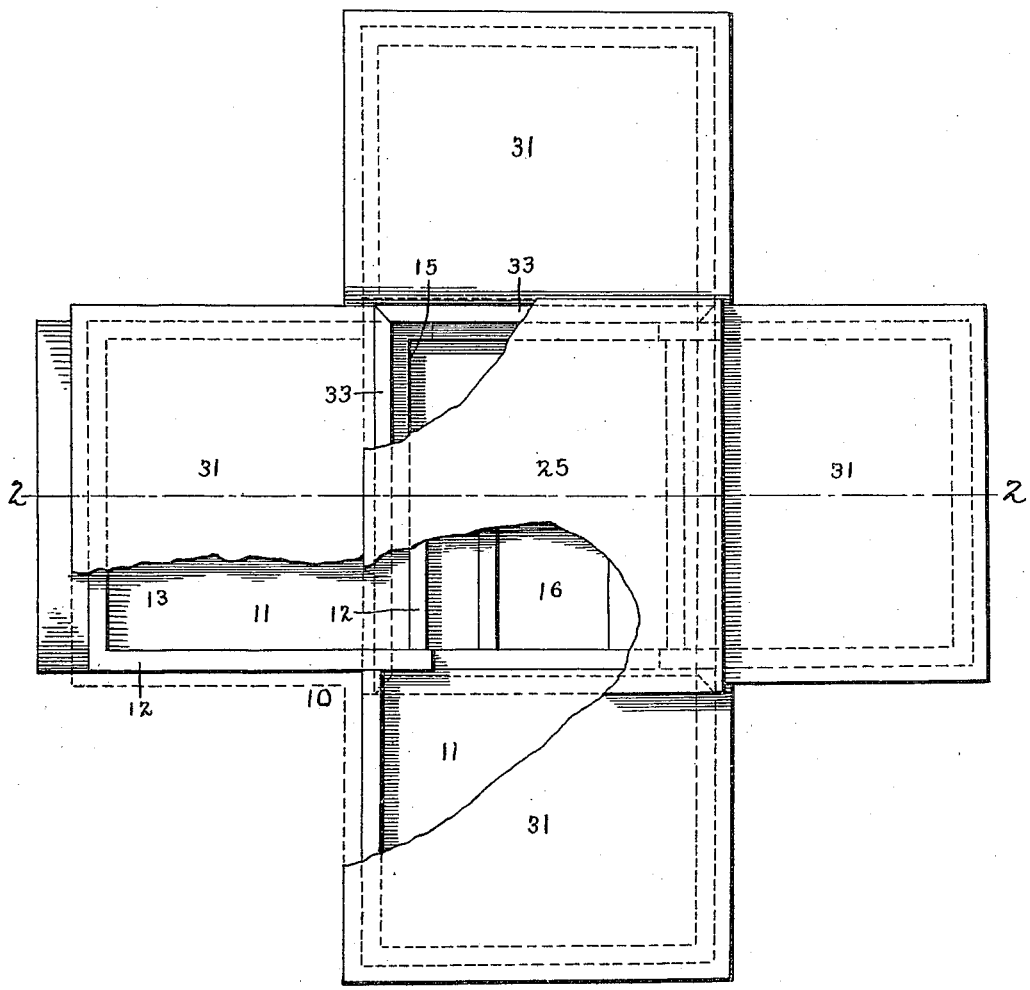

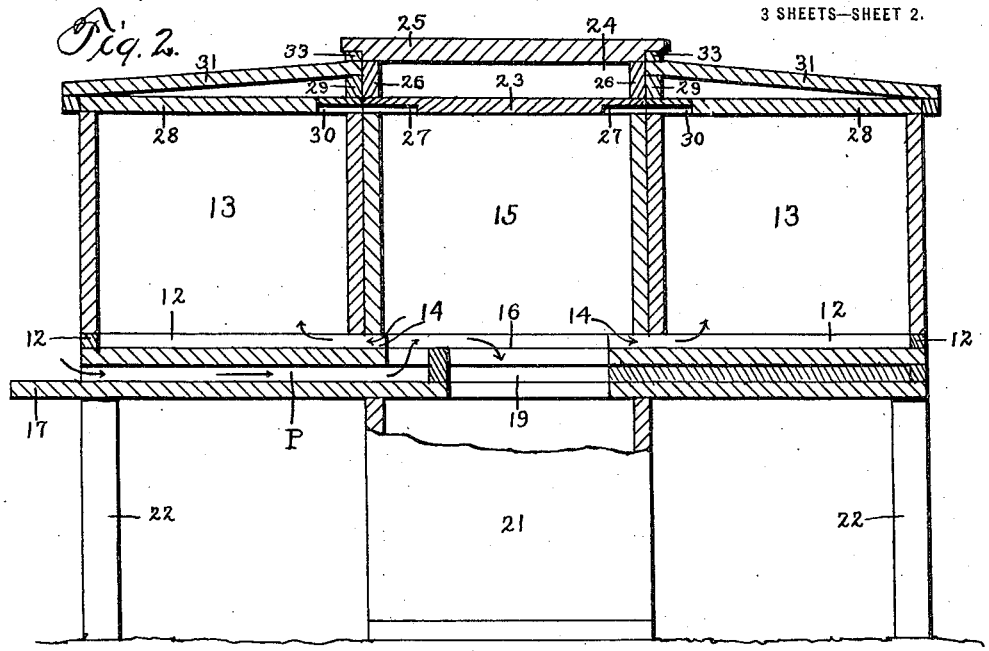
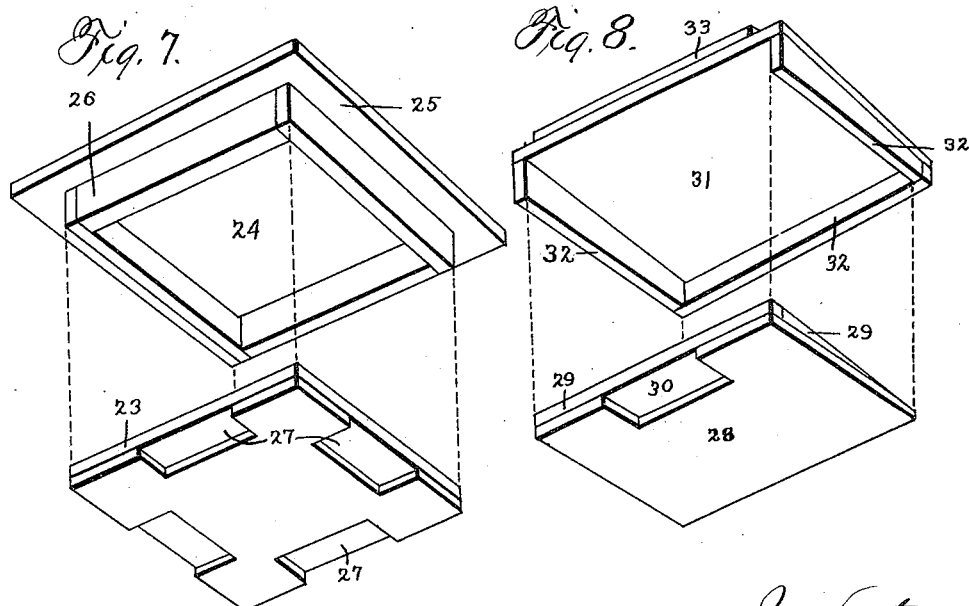

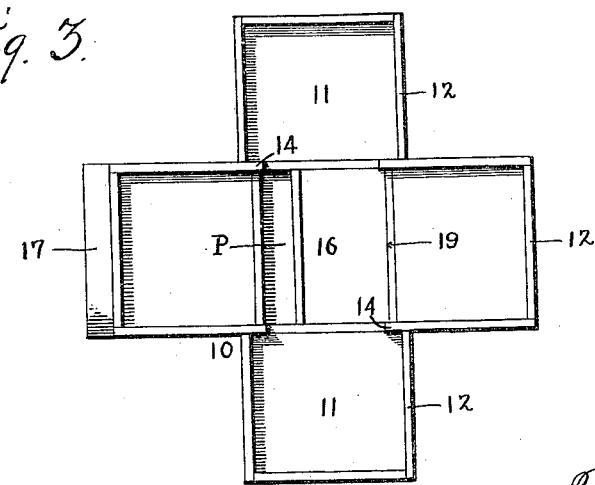
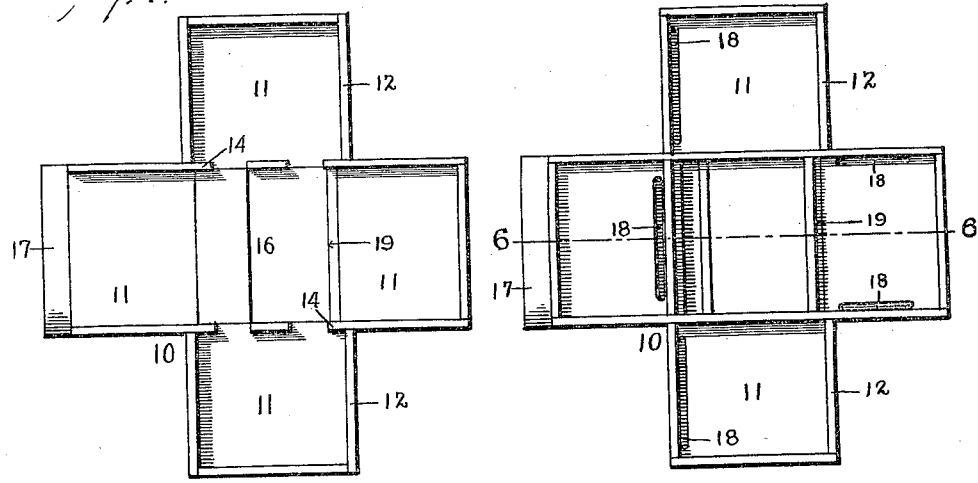
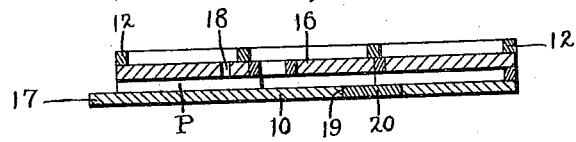

WILLIAM F. McCREADY, OF ESTERO, FLORIDA, ASSIGNOR TO THE KORESHAN UNITY, OF ESTERO, FLORIDA, A CORPORATION OF FLORIDA.

BEEHIVE.

1,402,169.   Specification of Letters Patent.   Patented Jan. 3, 1922.

Continuation of application Serial No. 47,281, filed August 21, 1915. This application filed August 1, 1919. Serial No. 314,638.

*To all whom it may concern:*

Be it known that I, WILLIAM F. MC-CREADY, a citizen of the United States, residing at Estero, in the county of Lee and State of Florida, have invented certain new and useful Improvements in Beehives, of which the following is a specification, reference being had therein to the accompanying drawings.

The object of my invention, in the broadest view, is to make improvements in bee hives to secure certain benefits or advantages, hereinafter set forth, to both bees and apiarist, and, in the narrower view, or more particularly, to change the construction of the hive bottom and top from the constructions heretofore known; and to this end, my invention consists in the construction substantially as hereinafter specified and comprehended within the subjoined claims.

In the drawings:

Fig. 1 is a top plan view of a bee-hive embodying my invention;

Fig. 2 is a vertical section thereof, on the line 2—2 of Fig. 1;

Figs. 3, 4 and 5 are, respectively, top plan views of various forms of bottom, made in accordance with my invention;

Fig. 6 is a vertical section through the bottom board shown in Fig. 5;

Fig. 7 is a perspective view of the two top cover members of the center hive unit or section, separated from each other; and Fig. 8 is a like view of the members of the top cover of one of the lateral units, or sections.

Briefly described, my invention in what I regard now as its best form, and as an entire organization, comprehends the arrangement of a plurality of similar hive bodies in quincunx order, there being a central, rectangular body and a lateral, similar body on each of the four sides, and as many bodies vertically or tiered up, as may be desired, with appropriate bottom boards and top covers of novel construction. With the internal construction or equipment of the various hive bodies, such as the brood and honey section frames, fences, etc., my present invention is not concerned, and it is therefore needless to describe the same, for such can be any of desired or standard or customary kind. It is one of the important characteristics of my invention that communication between all the hive bodies and the outside shall be through a single entrance, from which a passage leads inward beneath one of the hive units, and which branches or ramifies to the other hive bodies and, as I prefer, that communication, or passage, of bees must always be by way of the central unit or section, which passage is in communication with the entrance by a tunnel or "subway," in the bottom board.

The bottom board 10, no matter what its detailed construction, is cruciform in plan view, and around the sides or rim of each rectangular arm 11 of the cross, is a narrow ledge or rib 12 for the support of the hive body 13, so that ample space is afforded for passage of bees below the frames supported in the body; and in the form of bottom shown in Figs. 3 and 4, the ledges of two opposite arms are carried inward a short distance to provide supports 14 for the central hive body 15 to space it the proper distance above the bottom board's central portion 16. One, and only one of the arms 11 is channeled or hollowed out horizontally to provide a passage, P, that leads from its outer end, (where an alighting board 17 is provided) to a point where it opens into the space beneath the central hive body 15, and preferably, as shown in Figs. 2 and 3, such passage is of tunnel or "subway" form, although, as shown in Fig. 4 it may be the space between the opposite side ledges of that arm. The entering bees, reaching the space beneath the central hive body are free to go therefrom into the hive bodies above the various arms, as well as the central hive body, but it is only by that central space that they have access to the various hive bodies. If preferred, each arm, as well as the central space 16 may be tunneled or provided with a "subway", as shown in Figs. 5 and 6, in which case, one or more vertical slots or holes 18 lead from the subway of each arm directly to the space above.

In the central section 16, is a rectangular hole 19 closed by a removable board 20, so that, if desired, a hive body 21 may be placed beneath the central section, communication with which is afforded the bees through the hole 19 when the board is absent. Thus, at the central part, the bottom board 10 may rest upon and be supported by a hive body, and the various arms can rest upon and be supported by posts or legs 22, suitably placed.

My arrangement of the means of communication between inside and outside of hive is of special importance in controlling robbing because the robber bees must pass through long and tortuous passages before they can get to the stored honey, and thus the opportunities of the bees on guard in the hive are very excellent to arrest, or stop, marauding bees.

The cover for the central unit or section comprises a lower rectangular board 23 of the dimensions of the hive body, on the top of which it rests, and an upper member 24 that consists of a rectangular, flat, or plane upper piece 25, with a rectangular ledge 26 which, at its bottom edge rests upon the top of the lower member, whose external dimensions it matches, so that a dead air space or chamber is thus provided within the rectangular ledge 26. One surface of the lower member 23 is plane, while on the opposite face at each of the four sides, is a notch or cavity 27 whose purpose will presently appear.

Each top cover for the body of each arm, is likewise composed of two members, a lower member 28, having on one surface, at three sides, a ledge 29, and on the opposite surface, a notch or recess 30 at one side, only, and an upper member 31 whose top surface slants downward and outward, while on its underside, on three edges is a ledge 32 within which the lower member snugly fits; it being wedge-shaped, or tapering, due to the inclination of two opposite sides of its ledge. When the ledge is uppermost, and the two members are together, the lower within the upper, a dead air space is provided in the top cover. When thus assembled, the notch 30 registers with an adjacent notch in the central top cover lower member, and thus communication at the top of the hive bodies is provided between the central unit and each of the lateral units, so that with the passages at the bottom, the work of ventilating or internal circulation of air by the customary wing-fanning of the bees is greatly facilitated. The bottom board construction shown in Fig. 4, since it provides for the direct flow of air currents, is of particular value in this connection and is therefore best suited for warm localities. On the other hand, and this is especially true of the tunneled bottom boards, the hive occupants are protected from adverse weather conditions, such as wind storms, low temperature, etc.

The top cover of the central unit or section overlaps, at its four sides, the inner edges of the top cover of the four lateral units, or sections, and rests upon a vertical rib or strip 33 on each of said lateral top covers. Thus, the covers are rain, snow and water-proof. Any water passing from the central top cover falls on the sloping tops of the lateral covers, and cannot pass the strips 33 but is shed over such inclined tops. Wind cannot displace the top covers for the side flanges of the lateral covers overlap the sides of the hive bodies, and the ledge of the central cover is nested snugly within the four surrounding lateral covers, and within the rain excluding strips 33, and hence, all covers are firmly braced and held against side wind pressure.

The air spaces in the top covers being heat insulators, make for lower temperature within the hive, in summer, and higher temperature in winter.

For wintering the colony, all that is required is that the inner or lower top cover members be inverted, to place the plane sides of all lowermost; lay strips of wood over all the apertures in the bottom board, excepting the one leading to the hive exterior; and where cold becomes severe, fill the outer, or lateral hive bodies with chaff, or other material. An important advantage of the quincunx arrangement of the hive units is that the central unit is housed or enclosed on all four sides.

When the bee-keeper is manipulating the contents of any lateral or outside unit, bees can be prevented coming out of the tops of any other section merely by inverting the inner or lower member of the central top cover, to place the notches or recesses therein, uppermost, and when working with the central section, egress of bees from the top can be prevented by inverting the lower members of the outer section top covers so as to place the notches therein uppermost.

This application is a continuation of application No. 47,281, filed August 21, 1915.

What I claim is:—

1. A bee hive comprising a quincunx arrangement of rectangular hive bodies one of such bodies being at the center of the group, and each of its sides being abutted by one of the other bodies of the group.

2. A bee hive comprising a quincunx arrangement of rectangular hive bodies one of such bodies being at the center of the group, and each of its sides being abutted by one of the other bodies of the group, and a bottom board common to all the units.

3. A bee hive comprising a quincunx arrangement of rectangular hive bodies one of such bodies being at the center of the group, and each of its sides being abutted by one of the other bodies of the group, and a bottom board common to all the units, of permanent, cruciform shape.

4. A bee hive comprising a quincunx arrangement of rectangular hive bodies one of such bodies being at the center of the group, and each of its sides being abutted by one of the other bodies of the group and having an entrance passage that is single in its outer portion and ramifies at its inner portion.

5. A bee hive comprising a group of hive bodies placed side by side, each having a space for bees in its bottom part, and a single entrance passage leading to all the spaces and being the only communication therebetween and the hive entrance.

6. A bee hive comprising a group of hive bodies placed side by side, each having a space for bees in its bottom part, and a single entrance passage leading to all the spaces and being the only communication therebetween and the hive entrance, said passage being tunnel-like.

7. A bee hive comprising a group of side by side hive bodies, a bottom board of permanent, unitary form, having a section below each hive body, and an entrance opening at only one of the bodies from which a passage leads beneath that body and at its inner end is in communication with the interior of all the other bodies.

8. A bee hive comprising a group of side by side hive bodies, a bottom board of permanent, unitary form, having a section below each hive body, and an entrance opening at only one of the bodies from which a passage leads beneath that body and at its inner end is in communication with the interior of all the other bodies, said passage being tunnel-like.

9. A bee hive comprising central and lateral bodies, an entrance, a bee passage leading beneath but one of said lateral bodies, from said entrance, to a bee space at the bottom of the central body, said space being in communication with similar spaces at the bottom of the other bodies.

10. A bee hive comprising a group of side by side hive bodies, a bottom board of permanent, unitary form, having a section below each hive body, and an entrance opening at only one of the bodies from which a passage leads beneath that body and at its inner end is in communication with the interior of all the other bodies, and separately removable top covers for the several hive bodies.

11. A bee hive comprising a group of side by side hive bodies, a bottom board of permanent, unitary form, having a section below each hive body, and an entrance opening at only one of the bodies from which a passage leads beneath that body and at its inner end is in communication with the interior of all the other bodies, and openings establishing communication between the several bodies at the top, where they adjoin.

12. A bee hive comprising a group of side by side hive bodies, a bottom board of permanent, unitary form, having a section below each hive body, and an entrance opening at only one of the bodies from which a passage leads beneath that body and at its inner end is in communication with the interior of all the other bodies, and openings establishing communication between the several bodies at the top, where they adjoin, said openings being in one side of invertible covers.

13. A bee hive cover comprising upper and lower members, spaced apart to provide an air space, and one of said members having a marginal ledge that circumscribes said space the lower member being plane and invertible.

14. A bee hive comprising a quincunx arrangement of rectangular hive bodies one of such bodies being at the center of the group, and each of its sides being abutted by one of the other bodies of the group, and separate covers for each of said bodies, the central cover being nested within the four lateral covers.

15. A bee hive comprising a quincunx arrangement of rectangular hive bodies one of such bodies being at the center of the group, and each of its sides being abutted by one of the other bodies of the group, and separate covers for each of said bodies, the central cover being nested within the four lateral covers and overlapping the same.

16. A bee hive comprising a quincunx arrangement of rectangular hive bodies one of such bodies being at the center of the group, and each of its sides being abutted by one of the other bodies of the group, and separate covers for each of said bodies, the central cover being nested within the four lateral covers and overlapping the same, said lateral covers having upstanding strips where they are overlapped.

17. A bee hive bottom board having an opening from top to bottom closed by a removable closure.

18. A bee hive comprising a cluster of side by side units, a single bottom board for all said units, and a hive body on which the bottom board rests.

In testimony whereof I affix my signature.

WM. F. McCREADY.